United States Patent [19]

Kato et al.

[11] Patent Number: 5,050,045
[45] Date of Patent: Sep. 17, 1991

[54] SELF-LUMINESCENT POINTER DEVICE FOR A GAUGE

[75] Inventors: Miki Kato, Kariya; Katsuhiro Kumazawa, Anjo; Kazuhiko Miyazaki, Nishikamo, all of Japan

[73] Assignee: Nippondenso Co., Ltd., Kariya, Japan

[21] Appl. No.: 591,097

[22] Filed: Oct. 1, 1990

[51] Int. Cl.⁵ ............................................ G01D 11/28
[52] U.S. Cl. ...................................... 362/23; 116/288; 362/220; 362/263
[58] Field of Search ...................... 116/288; 362/23, 26, 362/217, 220, 221, 263

[56] References Cited

U.S. PATENT DOCUMENTS 3,219,008 11/1965 Harris et al. ...................... 116/288 X
4,163,428 8/1979 Ishikawa .............................. 116/288
4,252,078 2/1981 Fukasawa et al. .................... 116/288

FOREIGN PATENT DOCUMENTS 63-141256 6/1988 Japan .
64-9356 1/1989 Japan .

Primary Examiner—Stephen F. Husar
Attorney, Agent, or Firm—Cushman, Darby & Cushman

[57] ABSTRACT

A self-luminescent pointer device for a gauge has the pointer which is fitted on a pointer shaft and includes an elongated discharge tube. A constricted portion is formed on a part of an outer surface of its elongated hollow rod bulb of the discharge tube. An interior electrode is provided at the end of the bulb and an exterior electrode is provided on the outer surface of the bulb in its axial direction. The constricted portion of the bulb is engaged with a cut-away portion of a holding plate so that the discharge tube is positioned and fixed in its longitudinal direction. Electric power is supplied to the interior electrode and the exterior electrode of the discharge tube through each power supply terminal.

7 Claims, 11 Drawing Sheets

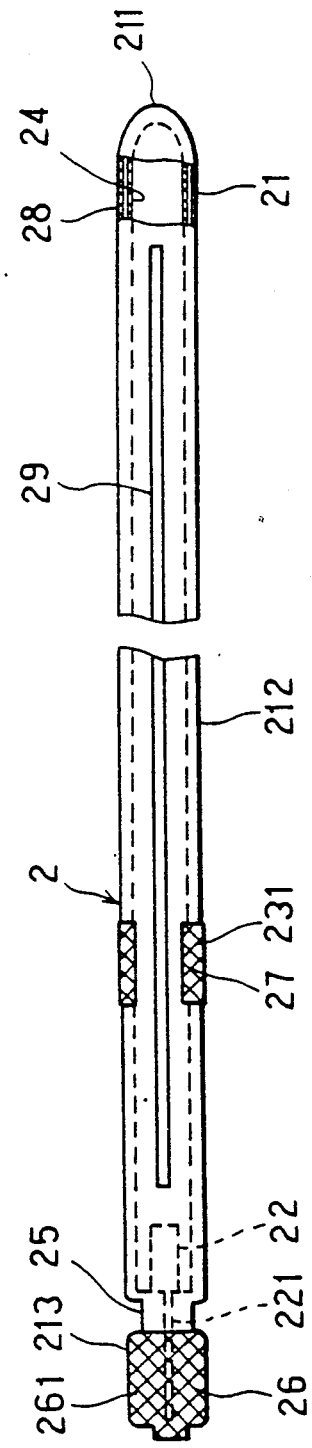
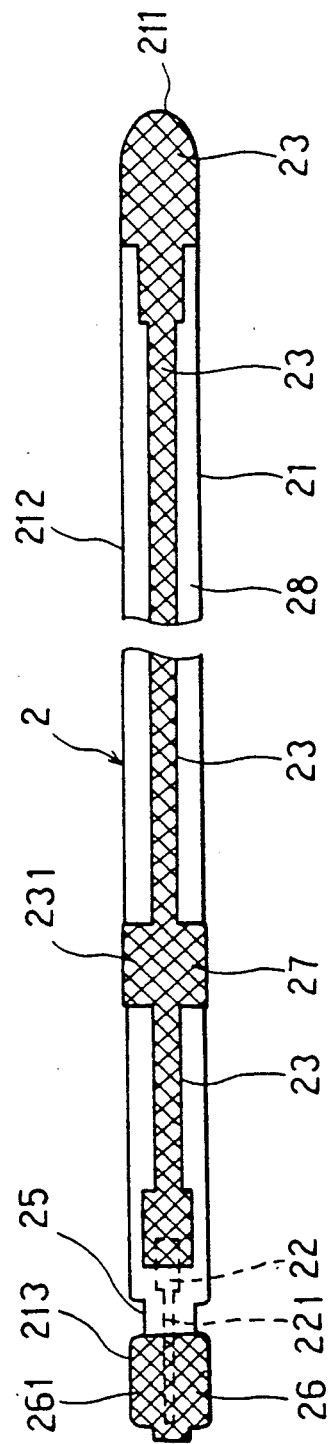

SELF-LUMINESCENT POINTER DEVICE FOR A GAUGE

BACKGROUND OF THE INVENTION

This invention relates to a pointer device for a gauge equipped with a self-luminescent pointer.

Since conventional pointer devices of this type are not luminescent, their luminescent intensity is limited. Accordingly their pointers tend to lack sufficient luminescent intensity as needed to match varying conditions in the surrounding such as in twilight or backlight as well as high-speed driving.

It is considered to employ a self-luminescent pointer for such a gauge. However, the employment of a self-luminescent pointer not only leads to a structural sophistication, including electric wiring, but has disadvantage of allowing the pointer mounted on a rotational shaft to shift in its axial direction under the influence of the rotation-caused centrifugal force. Furthermore, it is difficult to set the position of a pointer when setting the latter.

SUMMARY OF THE INVENTION

This invention, therefore, has its purpose to present a pointer device for a gauge which, while simple in construction and free from the influence of a centrifugal force which otherwise causes it to shift, always ensures excellent recognizability under all conceivable conditions and easy setting of the pointer.

For this purpose, a pointer device for a gauge according to the present invention comprises a pointer driving means for rotating a pointer shaft in response to input signals, a self-luminescent pointer provided with a discharge tube having a constricted portion on a part of the outer surface of an elongated hollow rod bulb thereof, an interior electrode provided at the end of the bulb and a strip-shaped exterior electrode provided on the outer surface of the bulb in an axial direction thereof, a pointer setting means fitted on the pointer shaft for securing the constricted portion of the discharge tube and fitting the discharge tube across the pointer shaft, and a power supply terminal for supplying power to the interior electrode and the exterior electrode of the discharge tube.

As a result of its structure described in the above, the pointer device according to this invention has a pointer which itself is luminescent and ensures sufficient luminescent intensity and assures excellent pointer recognizability under all conceivable conditions of unfavorable and adverse effects on driving in twilight or backlight as well as high-speed driving. According to the invention, the pointer is provided with a discharge tube which is structured with a constricted portion on a part of the outer surface of its elongated hollow rod bulb having an interior electrode provided at its end and a strip-shaped exterior electrode provided over the outer surface of the bulb in its axial direction and is fixed to the pointer shaft with the constricted portion. The thus-structured pointer device makes it possible to effect power supply to the pointer with simple-structure power supply terminals fitted to the pointer setting means and prevent the pointer to shift under the influence of a centrifugal force resulting from the rotation of the pointer shaft and makes the positioning of the pointer easy and precise in its setting.

BRIEF EXPLANATION OF THE DRAWINGS

FIG. 5 is a plan view of a discharge tube employed as the pointer of the above automobile speedometer.

FIG. 6 is a plan view of the discharge tube.

DETAILED DESCRIPTION OF THE INVENTION

In FIGS. 1 to 14 showing a preferable embodiment of the present invention designated by a numeral 300 is a automobile speedometer equipped with a pointer device 100.

Figure 2:
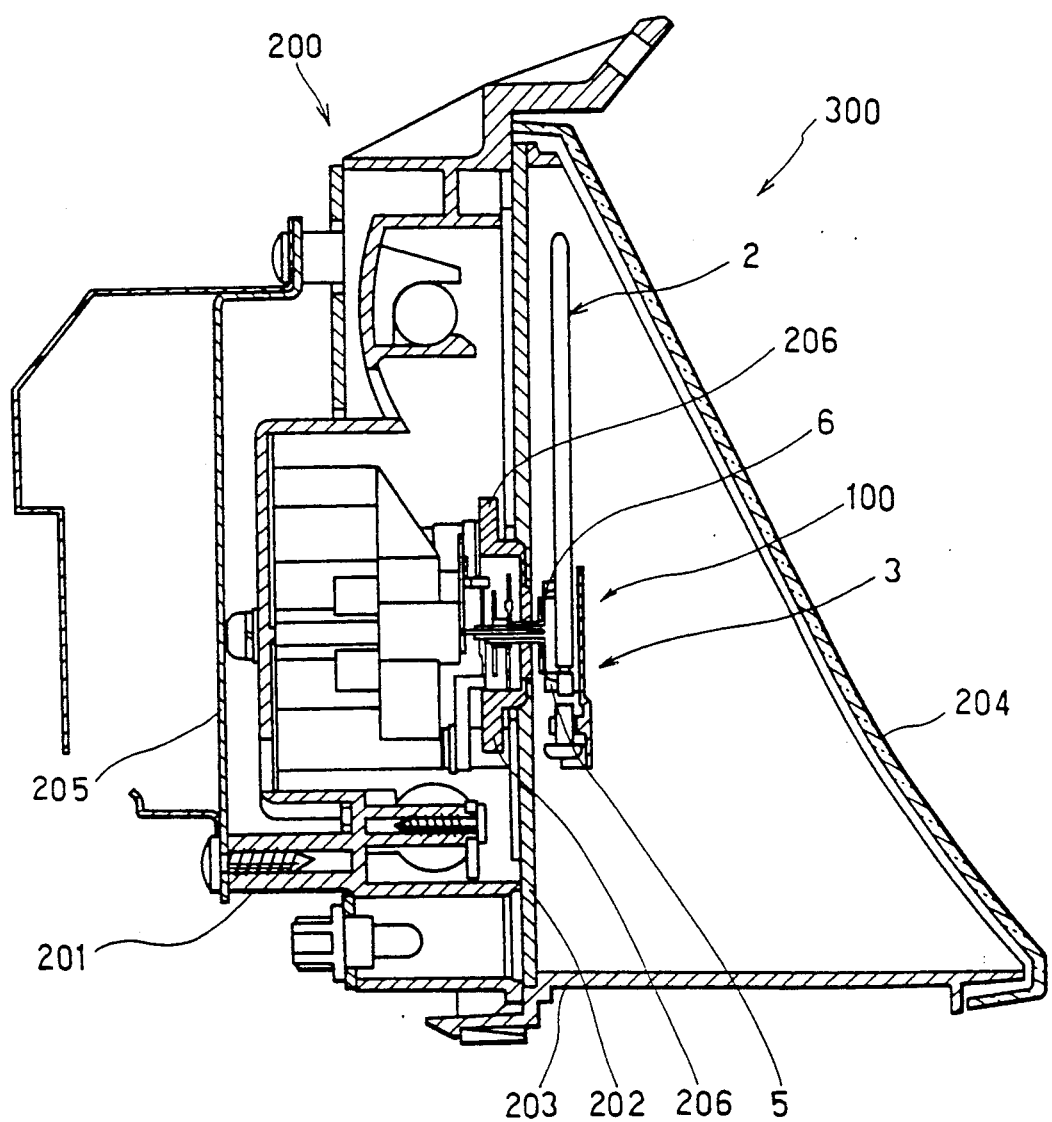
FIG. 2 is a cross-sectional view showing an automobile speedometer employing the pointer device according to the invention.
Figure 3:
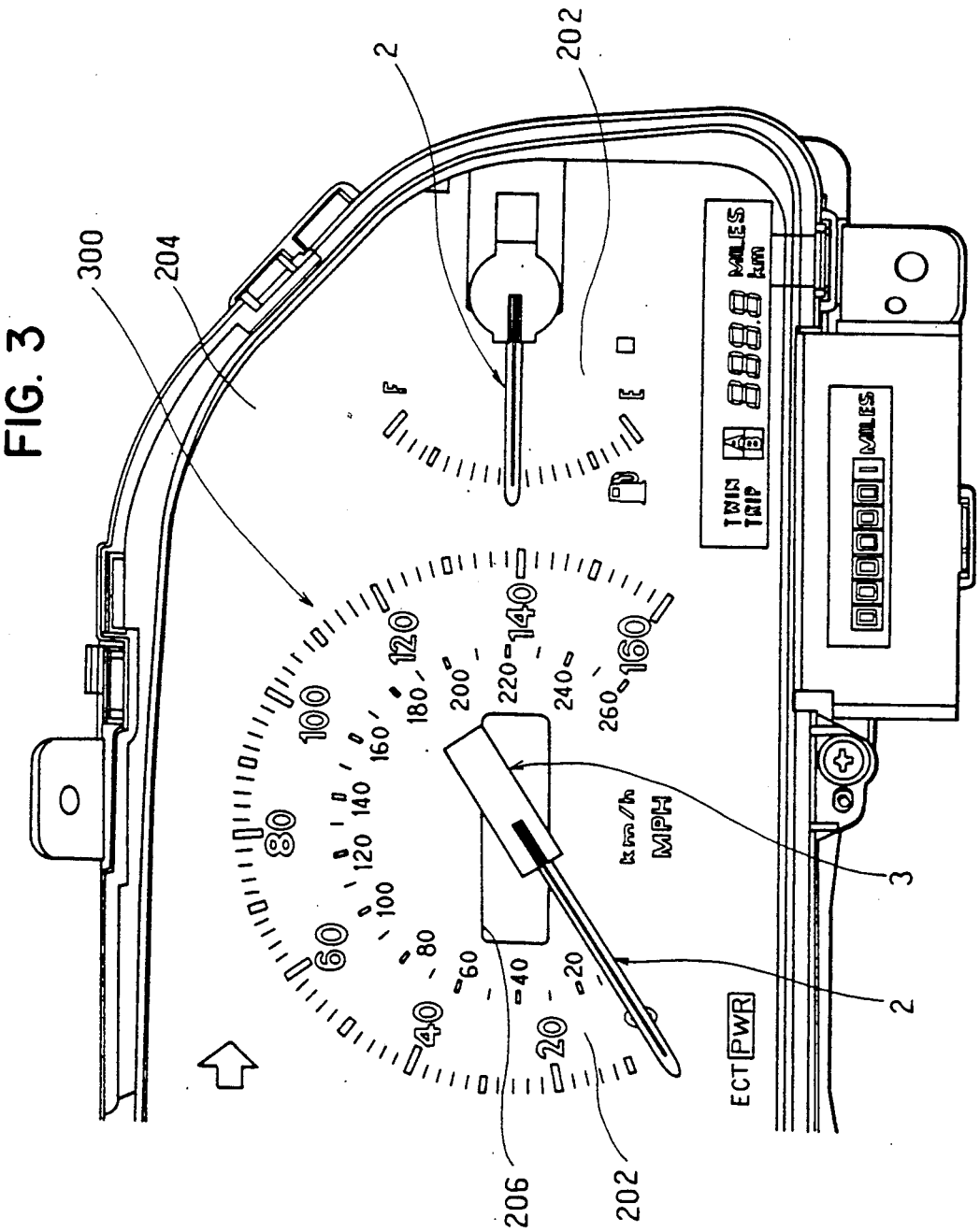
FIG. 3 is a front view of the automobile speedometer.

As shown in FIG. 2 and 3, the speedometer is fitted with the pointer device 100 set in a gauge housing 200.

The gauge housing 200 has a gauge casing 201 as its base body and a character display plate 202 bearing characters and scales, which is fitted to the surface thereof. The character display plate 202 has provided on its surface a frame-shaped gauge plate 203 fitted with a tansparent gauge glass 204 covering over the said character display plate 202. On the back of the gauge housing 201, a gauge sub-plate 205 serving as a circuit plate is fitted.

Figure 1:
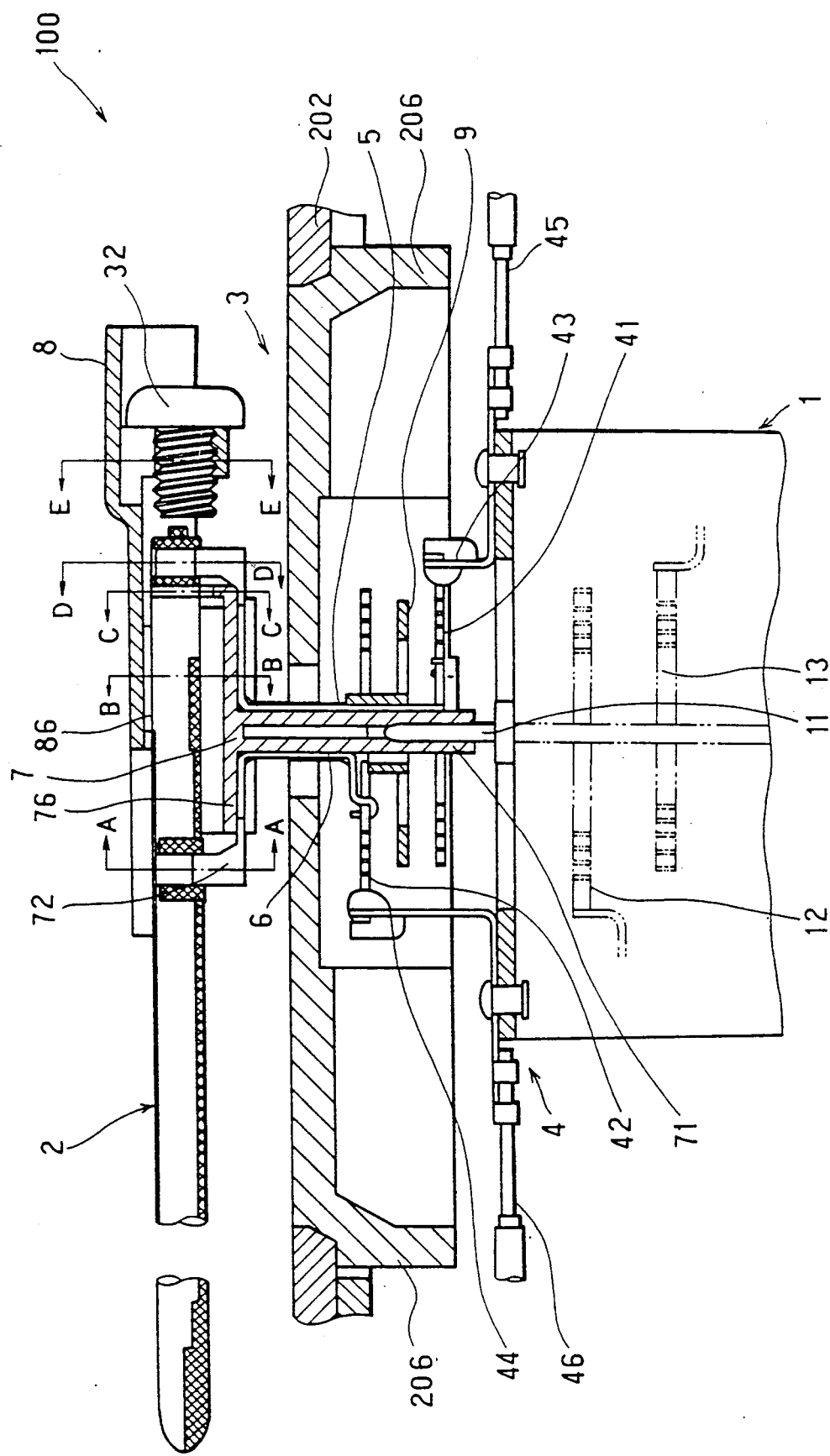
FIG. 1 is a cross-sectional view of a pointer for a gauge according to the present invention.

The pointer device 100, as shown in FIGS. 1 and 2, has a pointer driving means 1 wired in the gauge casing 201 on the back of the character display plate 202 to rotate a pointer shaft 111 in response to input signals, a discharge tube 2 serving as a self-luminescent pointer and a pointer setting means 3 to secure the back-end of the said discharge tube 2 across the pointer shaft 11. This pointer setting means 3 is fitted with power supply terminals 5 and 6 constituting a part of a power supply means 4.

The pointer driving means 1 is a conventional electric type, which applies a torque to the pointer shaft 11 in response to input signals changing in correspondence to a vehicle driving speed input into its built-in coil (not shown). The pointer shaft 11 is held at a certain position wherein the torque and the spring force of one pair of the spring 11 and 12 are balanced. The spring 11 and 12 are disposed on the shaft 11 confronting with each other. With this structure, the discharge tube 2 is rotated by the pointer shaft 11 along the said character display plate 202 to indicate a speed in correspondence to a vehicle driving speed and a remaining fuel volume.

Figure 7:
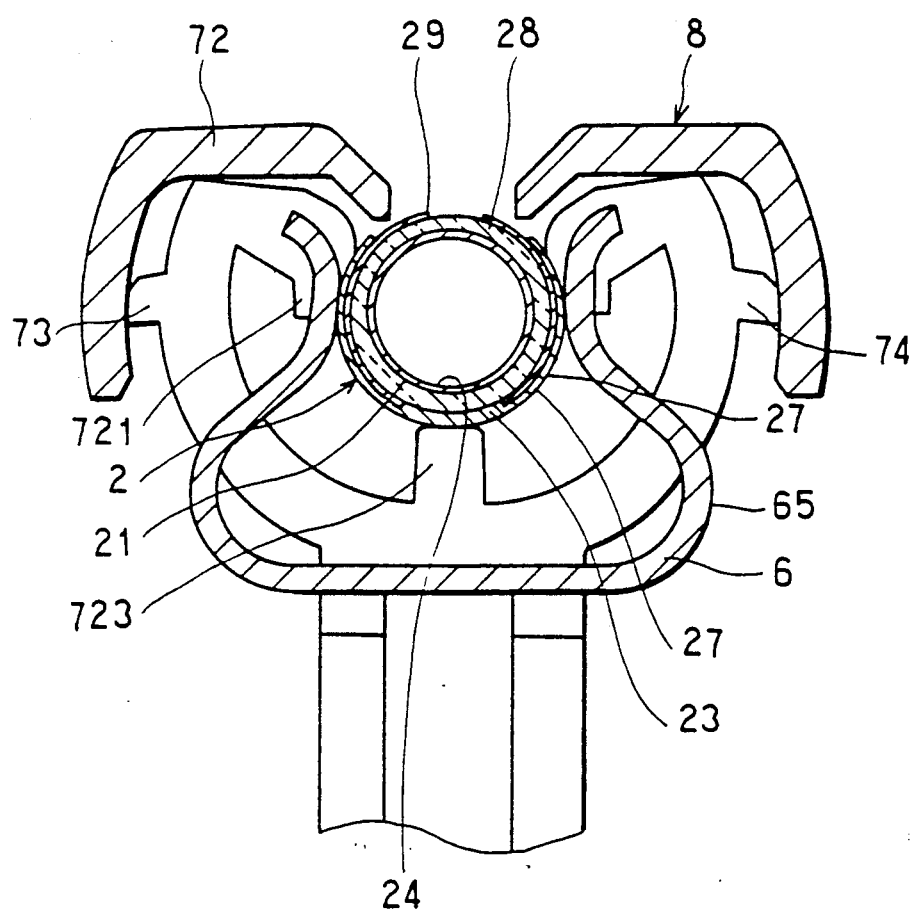
FIG. 7 is a cross-sectional view of the pointer device shown in FIG. 1, showing the pointer device along Line A—A.
Figure 8:
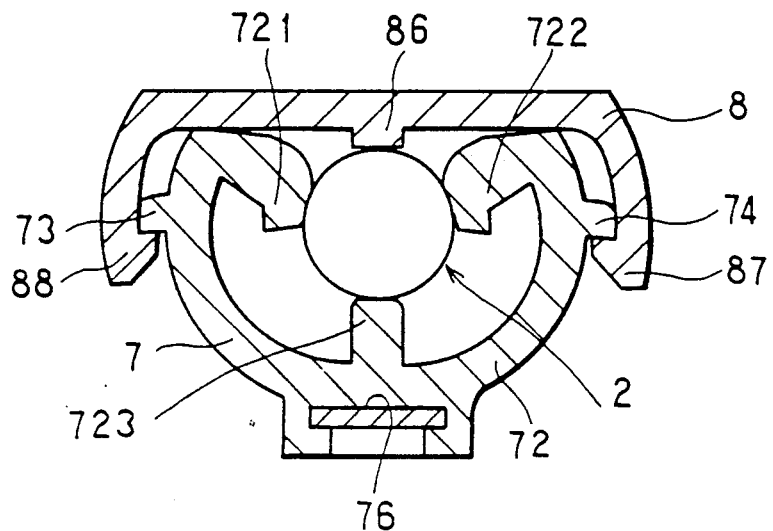
FIG. 8 is a cross-sectional view of the pointer device shown in FIG. 1, showing the pointer device along Line B—B.
Figure 9:
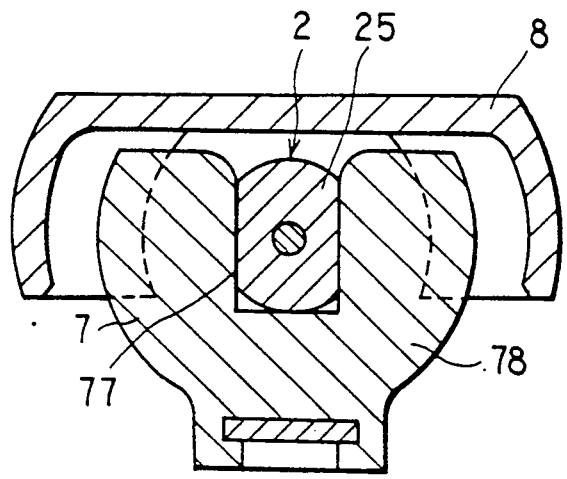
FIG. 9 is a cross-sectional view of the pointer device shown in FIG. 1, showing the pointer device along Line C—C.
Figure 10:
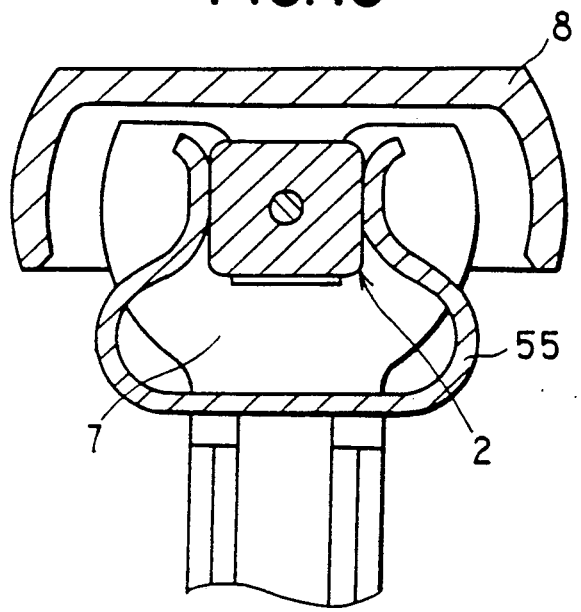
FIG. 10 is a cross-sectional view of the pointer device shown in FIG. 1, showing the pointer device along Line D—D.
Figure 11:
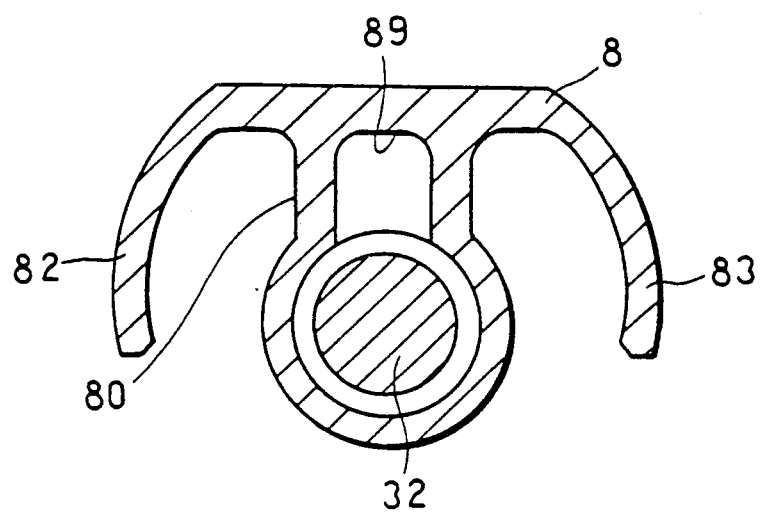
FIG. 11 is a cross-sectional view of the pointer device shown in FIG. 1, showing the pointer device along Line E—E.
Figure 12:
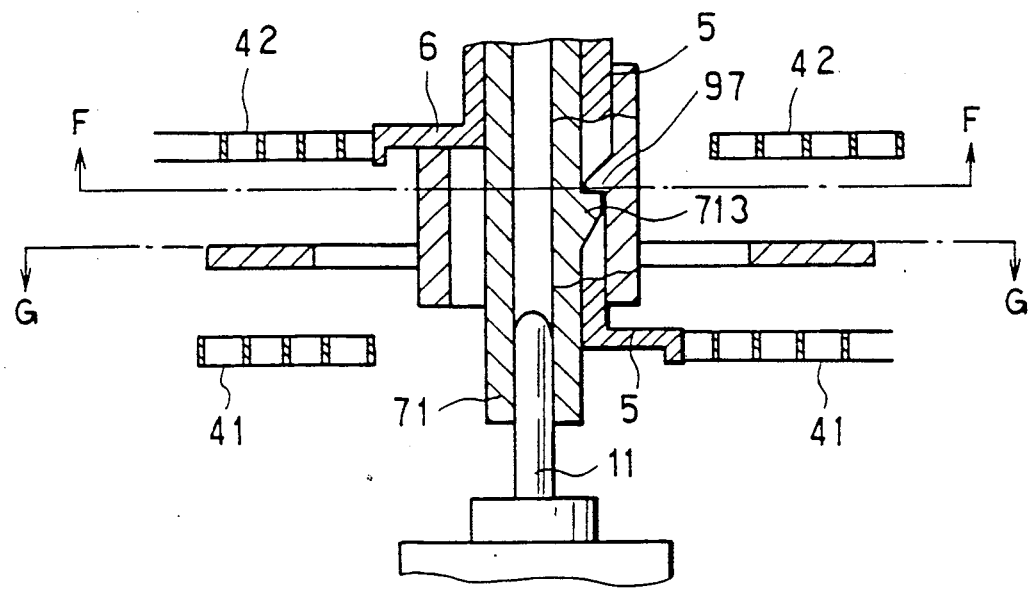
FIG. 12 is an enlarged view of a simulated portion of the pointer device.

As shown in FIGS. 5, 6 and 7, the discharge tube 2 has an elongated hollow rod bulb 21, an interior electrode 22 provided inside the said bulb 21 at one end of the latter 213 (back-end of the rotational center) and an exterior electrode 23 fitted to the outer surface of the bulb 21 along its longitudinal direction in a strip-like form. The bulb has its inner surface coated with a fluorescent layer 24.

The bulb 21 presents a hemispheric shell shape at its top and a cylindrical shape at its intermediate section and its hollow inside sealed in with inactive gas. The end 213 of the bulb 21 is full-filled and composed of a narrow groove section 25 forming a constricted section and a pair of power receiving sections 26 presenting a rectangular shape in their cross-sections. At the center of the end portion 213, there is embedded a naked lead wire 221 linked to the said interior electrode 22 and having its end 221 bent and pressed onto the surface of the power receiving section 26. The surface of the power receiving section 26 is coated with a silver paste electroconductive layer 261 to establish electric conductivity with the naked lead wire 22. The narrow groove section 25 of the bulb 21 has a silver paste electroconductive layer 231 coated thereon along its circumferential direction is a strip-like form to constitute a power receiving section 27 of the exterior electrode 23.

The outer surface of the bulb 21 is covered with a light shield film 28. The light shield film 28 has a slit 29 provided in the axial direction of bulb 21 and measuring 0.5 mm wide and 55 mm long to serve as a transillumination luminescent surface. The slit 29 is positioned with a gap of 2 mm left between its back-end and the top of the interior electrode 22.

The exterior electrode 23 is formed with electroconductive material such as carbon phenol and a silver paste coated over the bulb outer surface along its axial direction as a strip-like shape. In the embodiment of the invention described herein, the exterior electrode 23 is formed to gain a wider width as it gets away from the electrode 27 as shown in FIG. 6. With this structure, electrons projected from the interior electrode 22 toward the exterior electrode 23 are regulated over the whole of the exterior electrode 23 and, thereby, the discharge tube luminescence regularly with its luminescent intensity constant along its longitudinal direction.

The discharge tube 2 is an elongated hollow rod measuring 2.4 mm in diameter and weighing 0.8 g and having sealed therein 59 Toor of xenon and neon mixed in a gaseous form. The discharge tube 2, when high-frequency power is applied through a power supply means 4 described hereinafter, causes between the interior electrode 22 and the exterior electrode 23 a glow discharge which transforms itself into highly-luminescent visible light with an luminescent intensity of 5000 cd per square meter as it passes through the fluorescent layer 24.

The pointer setting means 3 is composed of a pointer boss 7 and a pointer boss cover 8, both of which are integrally formed with a polyvinylacetal resin.

Figure 4:
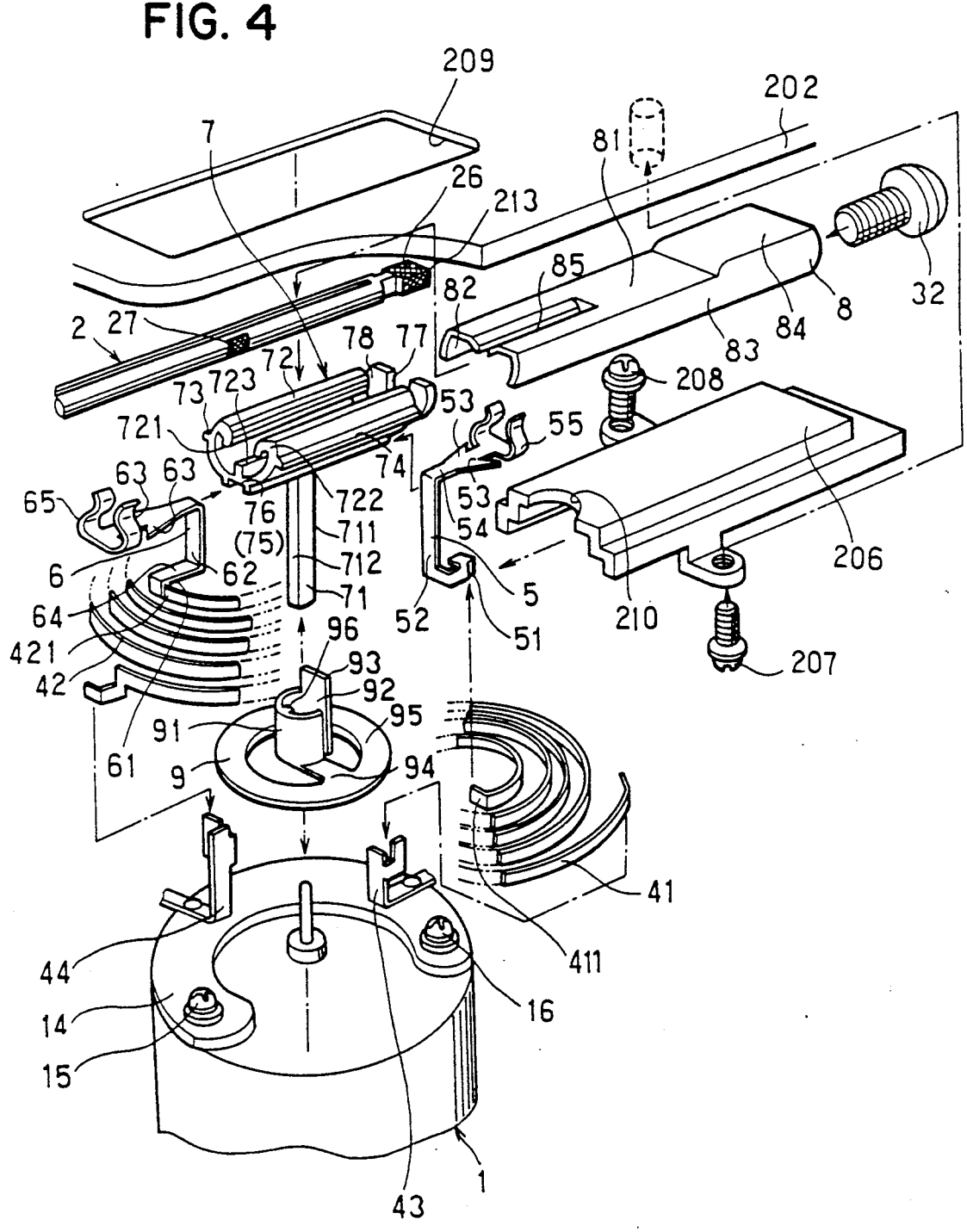
FIG. 4 is a structural drawing showing the primary sections of the automobile speedometer.

The pointer boss 7, as shown in FIGS. 1 and 4, has a cylindrical leg portion 71 and a bulb holding portion 72 made of elastic material, provided perpendicularly to the leg portion 71 and receiving the back-end of the discharge tube fitted therein.

The leg portion 72 has provided along its longitudinal direction over its outer circumferential surface planes 711 and 712 which are positioned to face opposite to each other to constitute contacts with the said power supply terminals 5 and 6.

The bulb holding portion 72, as shown in FIGS. 7 to 11 (which are cross-sectional views taken along, respectively, Lines A—A, B—B, C—C, D—D and E—E shown in FIG. 1), has an opening at its fore-end (upper position in FIG. 4) which presents a ring-like cross-section slightly larger than a half circle and has over its outer circumferential surface projected elongate ridges 721, 722 and 723 extending longitudinally between its edges and intermediate section. The projected ridges 721, 722 and 723 are positioned to have a gap of approximately 120 degrees therebetween at their tops which position on the same circle slightly smaller than the diameter of the discharge tube 2.

The bulb holding portion 72 has provided longitudinally along its edge portions 721 projected ridges 73 and 74 to engage with and lock the said pointer boss cover 8. The bulb holding portion 72 has on its lower surface trapezoidal grooves 75 and 76 provided in its longitudinal direction to secure the said power supply terminals 5 and 6. At its back-end, the bulb holding portion 72 has a holding plate 78 linked with a groove provided at the bottom of the bulb holding portion 72 and having a cut-away portion 77 presenting a U-shape cross-section.

The discharge tube 2 has its back-end fitted between the projected ridges 721, 722 and 723 and fixed under an elastic force of the bulb holding portion 72. The holding plate 78 is linked with the bulb holding portion 72 only at the latter's bottom with its sides left free to make elastic deformation of the bulb holding portion 72 smooth. The narrow ridge portion 25 of the discharge tube 2 is fitted into the cut-away portion 77 to get its positioning set and fixed in its longitudinal direction.

The pointer boss cover 8 presents a sleeve shape having a plane surface 81 at its fore-end and cylindrical surface 82 and 83 along its edges. The cover 8 has at its back-end a high ceiling and its fore surface 81 has a slit 85 formed from its top. The inner surface of the cover 8 has at its center an elongated projected ridge 86 extending in its longitudinal direction and having projected at the back-ends of its edges 82 and 83 claws 87 and 88 to engage with the projected ridge 73 of the said bulb holding portion 72. The cover 8 is fitted to the pointer boss 7 with its claws 87 and 88 engaged with the projected ridges 73 and 74 of the bulb holding portion 72.

The power supply means 4 is provided with the power supply terminals 5 and 6 and the hair springs 41 and 42 having its inner ends 411 and 421 secured to the top portions 51 and 61 of the power supply terminals 5 and 6. Provided opposite to each other, these springs 41 and 42 are connected to securing parts (terminals) 43 and 44 to secure its outer ends 412 and 422.

The securing parts 43 and 44 are fixed on a fixer plate 14 with a gap of 90 degrees therebetween. The fixer plate 14 formed with an insulation material shaped roughly like the letter "C" is fixed on the said pointer driving means 1 with screws 15 and 16.

The securing parts 43 and 44 are linked to the high-frequency power source (not shown) through leads 45 and 46. The high-frequency power source is shielded and generates high-frequency waves ranging from 1 kHz to 500 kHz. An amount of a frequency fluctuation of the power source is small and its band width is limited and narrow.

The frequency ranging from 1 kHz to 500 kHz as employed by the high-frequency power supply means 4 as explained above is to realize a glow discharge through the tube surface of the bulb 21. The definition of the employed frequency needs to be specific as a frequency less than 1 kHz does not effect sufficient luminescence of the discharge tube 2 full to its ends and a frequency above 500 kHz causes electro-magnetic interference with medium wave broadcasting to affect vehicle-mounted radio sets and others of the same kind. The reason for the power supply means designed to have less frequency fluctuations and a limited band width is to avoid interfering with submarine and fishing vessel radio communications and frequencies used for omega, loran, decca and other navigational and rescue-operation radios scattered within a range of VLF (very low frequency), LF (low frequency) and MF (medium frequency). The shielding of the high-frequency power supply means is to comply with Article 6 of the Radio Wave Control Law calling for energy leaked from such a device to be limited below 15 μV at a point 100 m away and be free from causing interference with electric devices such as radio sets mounted on vehicles or located in its vicinity.

The power supply terminals 5 and 6 have their intermediate portions 52 and 62 abutting against the circumferential planes 711 and 712 of leg portion 71 of the said pointer boss 7 and their back-ends extending in their radial direction and their fore-ends secured to the inner ends 411 and 421 of the hair springs 41 and 42. The intermediate portions 52 and 62 have extending radially from their fore-ends arm plates 54 and 64 having projected along their edges returns 53 and 63. The arm plates 54 and 64 are fitted into the rectangular grooves 75 and 76 provided at the bottom of the bulb holding portion 72. At their fore-ends, the arm plates 54 and 64 have securing portions 55 and 65 presenting roughly a reversed Ω shape and securing power receiving sections 26 and 27 of the discharge tube 2.

Between the hair springs 41 and 42, there is provided an insulator 9 which serves as securing parts 5 and 6 for the power supply terminals 5 and 6.

Figure 14:
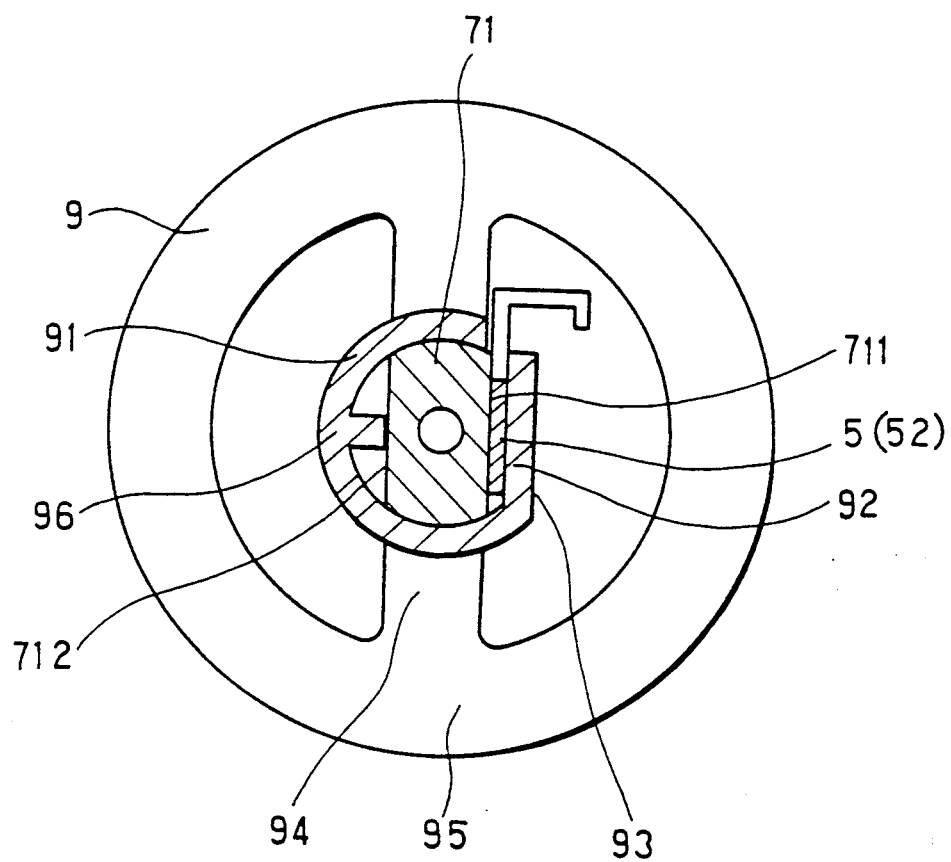
FIG. 14 is a cross-sectional view of the simulated portion as shown in FIG. 12 taken along Line G—G.

The insulator 9, as shown in FIGS. 4 and 14, is integrally formed with a polyvinylacetol resin and has a cylindrical hemispherical portion 91 slightly larger than a half circle, a holding portion 93 with a plane 92 extending in its radial direction from one end of the cylindrical hemispherical portion to the other and a ring-shaped plate 95 formed integrally with the back end (not shown) of the holding portion 93 through a linking portion 94. A ridge 96 is provided to the inside wall of the cylindrical hemispherical portion 91, which is projected in its axial direction. The insulator 9, as shown in FIG. 14, holds the intermediate portion 52 of the power supply terminal 5 secured between its plane plate 92 and the circumferential plane 711 of the leg portion of the pointer boss 7 and has its projected ridge 96 abutting against the plane 712. With this structure, the power supply terminal 5 is secured to the leg portion 71 of the pointer boss 7 at the latter's intermediate portion 92. Positioned between the hair springs 41 and 42, the ring-shaped plate 95 serves to prevent the hair springs 41 and 42 from getting into contact with each other under the influence of vibrations and other outer factors of the same kind.

Figure 13:
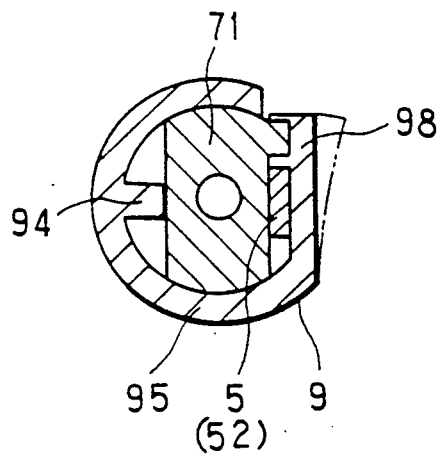
FIG. 13 is a cross-sectional view of the simulated portion shown in FIG. 12, showing it along Line F—F.

As shown in FIG. 13, the insulator 9 is secured to the leg portion 71 of the pointer boss 7 as the claw 97 formed inside the leg portion 71 engages with the projected ridge 713 with the arm as shown with a double-dotted line and returning back into its original position.

The hair springs 41 and 42 are adjusted to have one third of the torque of the hair springs 12 and 13 for driving the pointer shaft (shown at the bottom of FIG. 1).

The character display plate 202 has at its center an elongated opening 209 to serve to position the discharge tube 2 up in the vicinity of the character display plate 202.

There are provided two pairs of decorative plates 206 having hemispherical opening 210 slightly larger than the diameter of the leg portion 71 to cover the leg portion 71 downward from its center corresponding to the lower portion of the character display plate 202 and, positioned to be secured by the leg portion 71 from its two sides, fixed to the character display plate 202 with the securing screws 207 and 208.

The pointer device with the above-described structure is assembled in order as shown in FIG. 4.

It has (a) the power supply terminal 6 and (b) the power supply terminal 5 fitted into the securing grooves 75 and 76 of the pointer boss 7 from the left and the right on the drawings, respectively. (c) The leg portion 71 is fitted through the insulator 9. (d) The central end of the hair spring 41 for the pointer is fitted to the top 51 of the power supply terminal 5. (e) The discharge tube 2 is fitted into the bulb holding portion 72 (f) The cover 8 is fitted into the pointer boss 7. (g) The screw 32 is screwed in the groove 89. (h) The insulator 9 is loosely mounted on the pointer shaft. (i) The hair spring 41 has its outer end secured to the securing part 42. (j) The hair spring 42 has its outer end secured to the securing part 44. (k) The decorative sub-plate 206 is fitted to the character display plate 202 with (1) the screw 207 and (m) the screw 208. The embodiment of the present invention described herein has functions and effects as described hereinafter.

a. The pointer structured with the discharge tube 2 presents a high luminescent intensity which, in turn realizes excellent recognizability under varying conditions in the surrounding, such as in twilight or backlight as well as high-speed driving.

b. Since the discharge tube 2 is fixed in its axial direction with the narrow ridge portion 25 at the end portion 213 of the bulb 21 fixed into the U-shaped cut-away portion 77 of the holding plate 78 provided on the pointer boss 7, the pointer stays mechanically firmly secured, is free from detaching itself off and makes easy and precise the positioning of the pointer in its setting.

c. An end of the bulb 21 serves as the interior electrode 22. Therefore, the pointer has its top portion not different from its conventional counterparts in appearance. Since the discharge tube 2, calling for no exceptionally special consideration to improve its driving torque, can be made light in weight, the device according to the present invention realizes excellent mountability.

d. The luminescent surface of the pointer device shines brightly through the slit 29 to show its gauge to make its reading easy and precise.

e. The width of the luminescent surface can be set easily as required by changing the width of the slit 29.

f. With the slit 29 having its and positioned with a gap of 2 mm from the interior electrode 22 toward its top, the device is free from being affected by the blackening of tube in the vicinity of the electrode as caused by spattering of the interior electrode 2. As a result, the pointer device as a whole can maintain its original appearance and high luminescent intensity over a long period of time without needing to be replaced.

g. The discharge tube 2 can be fixed to the pointer securing means 3 easily by fitting it into the bulb holding portion 72 of the pointer boss 7, making its setting and replacing easy.

h. As power supply to the discharge tube 2 is effected through the hair springs 41 and 42, the pointer device can establish its electric connection to the discharge tube 2 easily and makes itself applicable to conventional gauges of the same kind.

i. The torque of the hair springs 41 and 42 is set at one third of that of the hair springs 12 and 13. This setting makes it possible to effect the zero adjusting of the pointer device with the fixer and, therefore, makes its application to devices of the same kind with a conventional structure. The zero adjusting of the pointer is thus made easy as well.

j. With the slit 85 formed on the pointer boss cover 8, the pointer can be provided with a long luminescent surface.

k. As the parts fitted above the pointer boss 7 are longitudinally arranged in a fine elongate form, the pointer device needs its opening to have only a fine elongate shape limited in size and presents no much difference from its conventional counterparts.

Figure 15:
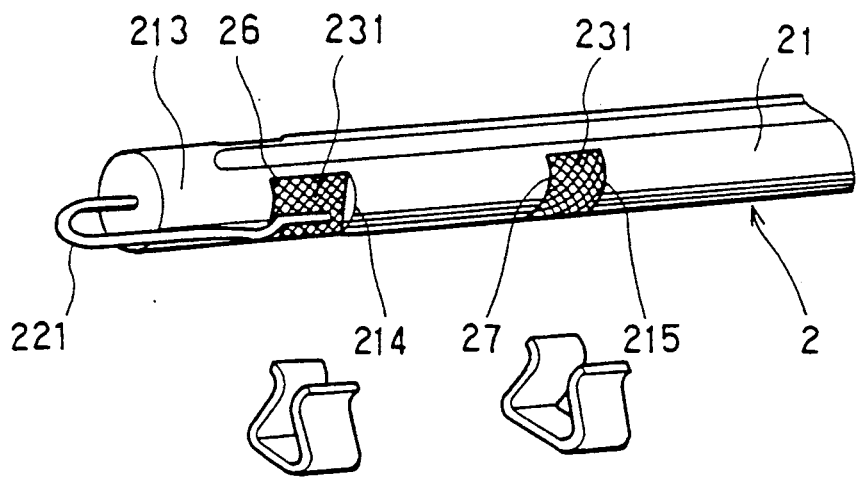
FIG. 15 is a perspective view of another embodiment of the invention, showing a power receiving portion of its discharge tube.

FIG. 15 shows another embodiment of the invention which is characterized by the provision of a power receiving part to the discharge tube 2.

In this second embodiment of the invention, the end portion 213 of the bulb 21 is formed in a half-circular shape provided with recessed sections 214 and 215 of which the inner surfaces are coated with a silver paste electroconductive layer. The recessed section 215 is coated in its circumferential direction with a strip-shaped silver paste electro-conductive layer 231 which constitutes a power receiving section 27 for the exterior electrode 23. The naked lead 22 connected to the interior electrode 22 is bent and pressed onto the interior electrode 22 is bent and pressed onto the surface of the recessed section 214. This recessed section 214 has its circumference coated with a strip-shaped silver paste electro-conductive layer 231 which serves as a power receiving section 26 for the interior electrode 22.

What is claimed is:

1. A pointer device for a gauge comprising:
   a pointer driving means for rotating a pointer shaft in response to input signals;
   a self-luminescent pointer provided with a discharge tube having a constricted portion on a part of the outer surface of an elongated hollow rod bulb thereof, and interior electrode provided at the end of the bulb and a strip-shaped exterior electrode provided on the outer surface of the bulb in an axial direction thereof;
   a pointer setting means fitted on the pointer shaft for securing the constricted portion of the discharge tube and fitting the discharge tube across the pointer shaft; and
   a power supply terminal for supplying power to the interior electrode and the exterior electrode of the discharge tube.

2. A pointer device as claimed in claim 1, wherein the discharge tube has a hemispheric shell shape at its top end and a cylindrical shape at its intermediate section.

3. A pointer device as claimed in claim 1, wherein the discharge tube has a rectangular shape in its cross section at its rear end and is full-filled at the same end.

4. A pointer device as claimed in claim 1, wherein the pointer setting means includes a pointer boss and a cover, the pointer boss having a cylindrical leg portion fitted on the pointer shaft, a holding portion holding the discharge tube elastically provided perpendicular to the leg portion and a holding plate securing the constricted portion, the cover covering a part of the discharge tube supported by the pointer boss.

5. A pointer device as claimed in claim 3, wherein the interior electrode has a electroconductive layer for receiving electric power formed on a surface of the rear end of the discharge tube, the layer engaging with the power supply terminal for supplying power to the interior electrode.

6. A pointer device as claimed in claim 2, wherein the exterior electrode has a electroconductive layer for receiving electric power formed at the intermediate section and covering the cylindrical portion of the discharge tube, the layer engaging with the power supply terminal for supplying power to the exterior electrode.

7. A pointer device for a gauge comprising:
   a pointer driving means for rotating a pointer shaft in response to input signals;
   a self-luminescent pointer provided with a discharge tube having an interior electrode provided at one end of an elongated hollow rod bulb thereof, an strip-shaped exterior electrode provided on the outer surface of the bulb in an axial direction thereof and a constricted portion provided near the one end of the bulb;
   a pointer setting means fitted on the pointer shaft for securing the constricted portion of the discharge tube unmovable in an axial direction thereof and fitting the discharge tube across the pointer shaft; and
   a power supply terminal for supplying power to the interior electrode and the exterior electrode of the discharge tube.

* * * * *